United States Patent
Ananthakrishnan (10) Patent No.: US 8,655,640 B2
(45) Date of Patent: Feb. 18, 2014

(54) AUTOMATIC WORD ALIGNMENT

(75) Inventor: Sankaranarayanan Ananthakrishnan, Waltham, MA (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 125 days.

(21) Appl. No.: 13/038,452

(22) Filed: Mar. 2, 2011

(65) Prior Publication Data

US 2012/0226489 A1    Sep. 6, 2012

(51) Int. Cl.
| | |
|---|---|
| G06F 17/28 | (2006.01) |
| G06F 17/20 | (2006.01) |
| G06F 17/27 | (2006.01) |
| G06F 17/21 | (2006.01) |
| G10L 21/00 | (2013.01) |
| G10L 25/00 | (2013.01) |

(52) U.S. Cl.
USPC ............... 704/2; 704/1; 704/3; 704/4; 704/5; 704/6; 704/7; 704/8; 704/9; 704/10; 704/277

(58) Field of Classification Search
USPC ................. 704/2, 1–10, 277, 235, 270, 275; 707/759, 769; 715/209
See application file for complete search history.

(56) References Cited

U.S. PATENT DOCUMENTS

| | | | | |
|---|---|---|---|---|
| 7,957,953 | B2 * | 6/2011 | Moore ........................ | 704/2 |
| 2002/0107683 | A1 * | 8/2002 | Eisele ........................ | 704/2 |
| 2004/0002848 | A1 * | 1/2004 | Zhou et al. ................. | 704/2 |
| 2005/0171757 | A1 * | 8/2005 | Appleby ..................... | 704/2 |
| 2006/0116867 | A1 * | 6/2006 | Moore ........................ | 704/2 |
| 2006/0287847 | A1 * | 12/2006 | Moore ........................ | 704/8 |
| 2007/0010989 | A1 * | 1/2007 | Faruquie et al. ........... | 704/2 |
| 2007/0083357 | A1 * | 4/2007 | Moore et al. ............... | 704/4 |
| 2008/0133218 | A1 * | 6/2008 | Zhou et al. ................. | 704/5 |
| 2009/0070095 | A1 * | 3/2009 | Gao ............................ | 704/2 |
| 2009/0177460 | A1 * | 7/2009 | Huang et al. ............... | 704/2 |
| 2009/0299731 | A1 * | 12/2009 | Owen ......................... | 704/9 |
| 2011/0258054 | A1 * | 10/2011 | Pandey et al. ......... | 705/14.72 |
| 2011/0301935 | A1 * | 12/2011 | Quirk et al. ................ | 704/2 |
| 2011/0307244 | A1 * | 12/2011 | He et al. ..................... | 704/4 |
| 2012/0101804 | A1 * | 4/2012 | Roth et al. ................. | 704/2 |

OTHER PUBLICATIONS

Keller, Frank, "A Probabilistic Parser as a Model of Global Processing Difficulty" Proceedings of the 25th Annual Conference of the Cognitive Science Society (2003).*

Ferri et al., "An experimental comparison of performance measures for classification" Pattern Recognition Letters 30 (2009) 27-38.*

Ananthakrishnan, Sankaranarayanan, et al. "An unsupervised boosting technique for refining word alignment" IEEE (Dec. 12, 2010) pp. 177-182.*

Ananthakrishnan, Sankaranarayanan, et al. "Alignment Entropy as an Automated Predictor of Bitext Fidelity for Statistical Machine Translation" BBN Technologies (2009), pp. 143-151.*

(Continued)

*Primary Examiner* — Pierre-Louis Desir
*Assistant Examiner* — Anne Thomas-Homescu
(74) *Attorney, Agent, or Firm* — Occhiuti & Rohlicek LLP (57) ABSTRACT

An unsupervised boosting strategy is applied to refining automatic word alignment. In some examples, the strategy improves the quality of automatic word alignment, for example for resource poor language pairs, thus improving Statistical Machine Translation (SMT) performance.

17 Claims, 5 Drawing Sheets

(56) References Cited

OTHER PUBLICATIONS

Wu, Hua, et al., "Boosting Statistical Word Alignment Using Labeled and Unlabeled Data" *Toshiba (China) research and Development Center* (Jul. 1, 2006) pp. 913-920.*

Brown, Peter F., et al. "The Mathematics of Statistical Machine Translation: Parameter Estimation" *Association for Computational Linguistics*. (1993) pp. 263-311.

Fraser, Alexander, et al. "Measuring Word Alignment Quality for Statistical Machine Translation" *ISI—University of Southern California*. (2006) pp. 1-8.

Ananthakrishnan, Sankaranarayanan, et al. "Alignment Entropy as an Automated Predictor of Bitext Fidelity for Statistical Machine Translation" *BBN Technologies*.(2009) pp. 143-151.

Ananthakrishnan, Sankaranarayanan, et al. "An unsupervised boosting technique for refiningword alignment" *IEEE* (Dec. 12, 2010) pp. 177-182.

Wu, Hua, et al. "Boosting Statistical Word Alignment Using Labeled and Unlabeled Data" *Toshiba (China) Research and Development Center* (Jul. 1, 2006) pp. 913-920.

* cited by examiner

FIG. 1

Algorithm 1 Iterative Word Alignment Boosting

| Line # | |
|---|---|
| 001 | $(\mathbf{S}, \mathbf{T}) \leftarrow (s_j, t_j)$  $\forall i \in (1, \ldots, N)$  $\forall j \in (1, \ldots, N)$ |
| 002 | $\mathbf{w}_0 = \{w_{0,j} \leftarrow 1\}$  $\forall j \in (1, \ldots, N)$ |
| 003 | for $i = 1$ to $M$ do |
| 004 | $A_i(\mathbf{S}, \mathbf{T}) \leftarrow \text{Model4}(\mathbf{S}, \mathbf{T}, \mathbf{w}_{i-1})$ |
| 005 | $PL_{i,j} \leftarrow A_{PL}^t (s_j, t_j)$  $(t_j, t_j) \in A$  $\forall j \in (1, \ldots, N)$ |
| 006 | $e_i \leftarrow \sum_{j=1}^{N} w_{i-1,j} \times PL_{i,j}$ |
| 007 | $\alpha_i \leftarrow 0.5 \times \ln \frac{1-e_i}{e_i}$ |
| 008 | $w_{i,j} = \frac{w_{i-1,j}}{Z} \times \exp(\alpha_i \times PL_{i,j})$ s.t. $\sum_{j=1}^{N} w_{i,j} = N$ |
| 009 | end for |
| 010 | $A(s_j, t_j) \leftarrow \bigcup_{i=1}^{M} A_i(s_j, t_j)$  $(t_j) \in A$  $\forall j \in (1, \ldots, N)$ |

| Test set | Baseline | Boosted | Relative Gain |
|---|---|---|---|
| $T^1_{E2P}$ | 13.8 | 14.4 | 4.5% |
| $T^2_{E2P}$ | 25.3 | 25.9 | 2.2% |
| $T^1_{P2E}$ | 17.3 | 17.6 | 1.8% |
| $T^2_{P2E}$ | 35.8 | 36.7 | 2.5% |

FIG. 4

| Measure | E2P | | P2E | |
|---|---|---|---|---|
| | Baseline | Boosted | Baseline | Boosted |
| *Unaligned source* | 73.5% | 81.3% | 66.4% | 75.3% |
| *Unaligned target* | 68.4% | 76.7% | 72.6% | 80.9% |
| *Phrase pairs* | 10.6M | 5.0M | 8.8M | 4.3M |
| *Table size* | 281M | 159M | 300M | 171M |
| *Speed (w/s)* | 52.6 | 57.2 | 50.4 | 54.9 |

FIG. 5

AUTOMATIC WORD ALIGNMENT

STATEMENT AS TO FEDERALLY SPONSORED RESEARCH

This invention was made with government support under NBCHC080097 awarded by DARPA. The government has certain rights in the invention.

BACKGROUND

This invention relates to automatic word alignment, for example, for use in training of a statistical machine translation (SMT) system.

SMT systems general rely on translation rules obtained from parallel training corpora. In phrase based SMT systems, the translation rule set includes rules that associate corresponding source language phrases and target language phrases, which may be referred to as associated phrase pairs. When a manually annotated corpus of associated phrase pairs is unavailable or inadequate, a first step in training the system includes identification and extraction of the translation phrase pairs, which involves the induction links between the source and target words, a procedure known as word alignment. The quality of such word alignment can play a crucial role in the performance of a SMT system, particularly when the SMT system uses phrase-based rules.

SMT systems rely on automatic word alignment systems to induce links between source and target words in a sentence aligned training corpus. One such technique, IBM Model 4, uses unsupervised Expectation Maximization (EM) to estimate the parameters of a generative model according to which a sequence of target language words is produced from a sequence of source language words by a parametric random procedure.

EM is an iterative parameter estimation process and is prone to errors. Less than optimal parameter estimates may result in less than optimal alignments of the source and target language sentences. The quality of the outcome depends largely on the number of parallel sentences available in the training corpus (a larger corpus is preferable), and their purity (i.e., mutual translation quality). Thus, word alignment quality tends to be poor for resource-poor language pairs (e.g., English-Pashto or English-Dari). In some cases a large proportion of words can be incorrectly aligned or simply left unaligned. This can lead to inference of incorrect translation rules and have an adverse effect on SMT performance. Thus, improving alignment quality can have a significant impact on SMT accuracy.

Other work has sought to improve word alignment quality. For example, a number of "boosting" algorithms have been proposed. In some traditional boosting algorithms (e.g., Ada-Boost) for binary classification tasks, an iterative weight update formula emphasizes incorrectly classified training samples and attenuates those that are correctly classified, in effect "moving" the class boundaries to accommodate the misclassified points. Classifiers trained at each boosting iteration (also known as weak learners) are combined to identify class labels for test samples. In many cases, this combination of weak learners results in better classification performance than using a standard train/test approach.

However, such placing of emphasis on poorly aligned sentence pairs can distort word alignments and reduce alignment quality over the entire corpus because poorly aligned sentence pairs tend to be lower quality or non-literal translations of each other.

Additionally, word alignment is significantly more complex than simple binary classification. Moreover, a direct measure of alignment quality (which can be used to update weights for boosting), such as alignment error rate (AER), can only be obtained from a hand-aligned reference corpus. Another issue is determining the best way to combine alignments from the weak learning iterations.

In one example, Wu et al. ("Boosting statistical word alignment using labeled and unlabeled data," *Proc. COLING/ACL*, Morristown, N.J., USA pp 913-920) proposed a strategy for boosting statistical word alignment based on a small hand-aligned (labeled) reference corpus and a pseudo-reference set constructed from unlabeled data. Theirs was a straightforward extension of the AdaBoost algorithm using AER as a measure of goodness. They used a weighted majority voting scheme to pick the best target word to be linked to each source word based on statistics gathered from the boosting iterations. On a small scale, Wu's strategy is practical, however, larger hand-aligned reference corpora are extremely expensive to construct and very difficult to obtain for resource poor language pairs.

In another example, Ananthakrishnan et al. ("Alignment entropy as an automated measure of bitext fidelity for statistical machine translation," *ICON '09: Proc. $7^{th}$ Int. Conf. on Natural Lang. Proc.*, December 2009) proposed a technique for automatically gauging alignment quality using bootstrap resampling. The resamples were word aligned and a measure of alignment variability, termed alignment entropy, was computed for each sentence pair. The measure was found to correlate well with AER. Subsequently, they proposed a coarse-grained measure of phrase pair reliability, termed phrase alignment confidence, based on the consistency of valid phrase pairs across resamples.

There is a need for an automatic word alignment system that improves upon traditional alignment techniques for the purpose of creating corpora, for instance, that are more representative of hand aligned corpora.

SUMMARY

In one general aspect, the invention relates to an unsupervised boosting strategy for refining automatic word alignment. One of the goals is to improve the quality of automatic word alignment, for example for resource poor language pairs, thus improving SMT performance.

In another aspect, in general, a method is applied to aligning linguistic units in paired sequences of units of a stored corpus that includes a plurality of paired sequences of units formed from two languages. The method includes determining a plurality of weights, one for each pair of the plurality of paired sequences of units, and maintaining the weights in a computer storage. A computer implemented procedure is applied to iteratively update weights. At each iteration, and for each pair of the paired sequences of units, an alignment is formed by aligning units in one sequence of the pair with units the other sequence of the pair using a parametric alignment procedure using a set of alignment parameters. A quality score is determined for the alignment for each of the paired sequences of units. The set of alignment parameters is updated using the alignment procedure and dependent on the plurality of weights for the paired sequences. The plurality of weights maintained in the computer storage is updated using the determined quality scores of the alignments. Finally, formed alignments from a plurality of the iterations are combined to determine a combined alignment of units of the paired sequences.

Aspects may include one or more of the following features.

The linguistic units comprise words.

The method further includes using the combined alignments as input to an automated training procedure for a Statistical Machine Translation (SMT) system. For instance, the trained SMT system is used to translate a sequence of units from a first of the two language to the other of the two languages.

The alignment procedure comprises an iterative statistically based procedure. For instance, the iterative statistically based procedure comprises an Expectation Maximization procedure.

Updating the alignment parameters using the alignment procedure and dependent on the plurality of weights for the paired sequences includes weighting a contribution of each paired sequence according to the maintained weight for said paired sequence.

Forming the alignment for each of the paired units includes forming a first alignment of units of the first language to units of the second language, and forming a second alignment of units of the second language to units of the first language.

The alignment parameters include a first set of parameters for forming an alignment from the first language to the second language and a second set of parameters for forming an alignment from the second language to the first language.

Forming the alignment for each of the paired units includes combining the first alignment and the second alignment.

Combining the first alignment and the second alignment includes linking units that are linked in each of the first and the second alignments.

Determining the quality score for the alignment for each of the paired sequences of units includes determining a normalized probability of producing units in one sequence of the pair from units of the other sequence of the pair.

Determining the normalized probability includes determining a geometric per-unit average of a product of a probability of producing a first sequence of units of the pair from the second sequence of units or the pair, and the probability of producing the second sequence of the pair from first sequence of the pair.

Combining the formed alignments from the plurality of the iterations to determine the combined alignment of units of the paired sequences includes forming for each of the paired sequences a union of the alignments from the plurality of iterations.

The steps are performed without requiring manual annotation of alignments of units in the corpus of paired sequences.

In another aspect, in general, a training system for machine translation includes a storage for a plurality of weights, one weight corresponding to each of a plurality of paired sequences of linguistic units formed from two languages in a stored corpus. The system also includes a module that includes storage for a set of alignment parameters and that is configured to iteratively update the plurality of weights. At each iteration, for each of the paired sequences of units, an alignment is formed by the module by aligning units in one sequence of the pair with units the other sequence of the pair using a parametric alignment procedure using the set of alignment parameters. The module is configured to determine a quality score for the alignment for each of the paired sequences of units, and then update the alignment parameters using the alignment procedure and dependent on the plurality of weights for the paired sequences, and update the plurality of weights maintained in the computer storage using the determined quality scores of the alignments. The module is further configured to combine the formed alignments from a plurality of the iterations to determine a combined alignment of units of the paired sequences.

In another aspect, in general, software comprises instructions embodied on a tangible machine readable medium for causing a data processing system to determine a plurality of weights, one for each of a plurality of paired sequences of linguistic units formed from two language in a stored corpus, and maintain the weights in a computer storage. The system is further caused to iteratively update the plurality of weights, including at each iteration, for each of the paired sequences of units, form an alignment by aligning units in one sequence of the pair with units in the other sequence of the pair using a parametric alignment procedure using a set of alignment parameters, determine a quality score for the alignment for each of the paired sequences of units, update the alignment parameters using the alignment procedure and dependent on the plurality of weights for the paired sequences, and update the plurality of weights maintained in the computer storage using the determined quality scores of the alignments. The software further causes the data processing system to combine the formed alignments from a plurality of the iterations to determine a combined alignment of units of the paired sequences.

Embodiments may have one or more of the following advantages.

The unsupervised boosting strategy can automatically estimate the alignment quality of a parallel corpus based on statistics obtained from the alignment process and emphasize sentence pairs that are potentially well aligned. Sentence pairs that are potentially poorly aligned are attenuated. When carried out in an iterative fashion, well aligned sentences are "boosted" such that they have a greater impact on the alignment statistics. Thus, the contribution of unreliable, potentially low quality translation pairs in the training corpus is minimized.

This approach can result in fewer unaligned words, a significant reduction in the number of extracted translation phrase pairs, a corresponding improvement in SMT decoding speed, and a consistent improvement in translation performance across multiple language pairs and test sets. The reduction in storage and processing requirements coupled with improved accuracy make the proposed technique ideally suited for interactive translation services, facilitating applications such as mobile speech-to-speech translation.

No hand-aligned reference corpus is necessary for the system. This eliminates the significant time and expense typically incurred in obtaining such a resource. Instead, an unsupervised measure of alignment quality is used.

The word alignment system aggregates word alignments from all boosting iterations using a "union" operation rather than voting and picking the best target word to be linked to a given source word. Thus translation accuracy across language pairs and test sets is improved, while the total number of extracted translation rules (e.g., phrase pairs) is reduced. This results in faster performance and lower memory consumption.

The algorithm functions at the word alignment level, and is independent of most SMT architectures. The boosted word alignment can be used to train different types of SMT systems, such as phrase-based (used in this work), hierarchical, and syntax-based systems.

The algorithm is a heuristic method for creating a many to many linkage between parallel sentence pairs.

The use of a bidirectional alignment mitigates the impact of errors that may occur in one translation direction.

Other features and advantages of the invention are apparent from the following description, and from the claims.

DESCRIPTION

1 Overview

Figure 1:
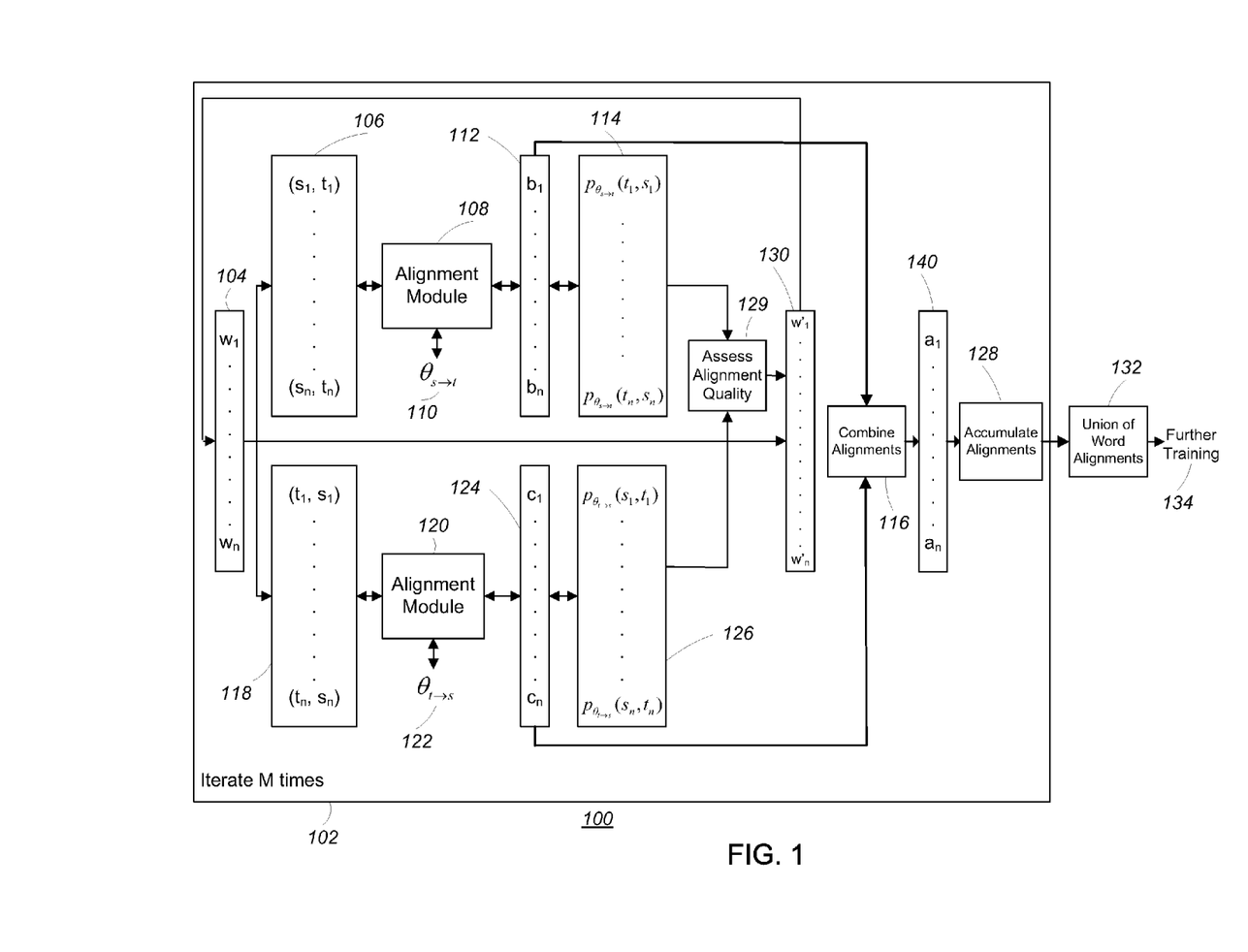
FIG. 1 is a block diagram of one embodiment of an iterative boosting system for automatic word alignment.
Figure 2:
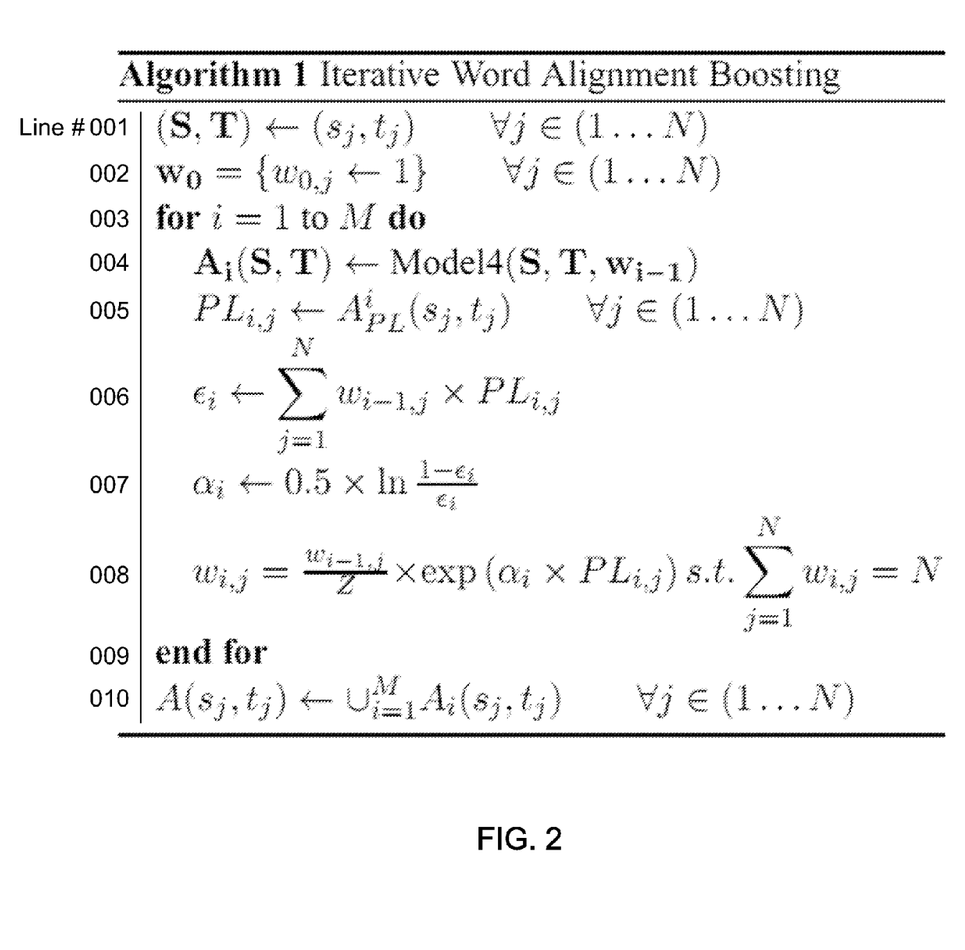
FIG. 2 is a pseudo code representation of an iterative boosting system for automatic word alignment.

Referring to FIG. 1, one embodiment of a word alignment system 100 is configured to implement an iterative boosting word alignment algorithm. (Note that word "boosting" should be understood only within the context of this description and not to connote properties where it is used in other contexts.) The system iteratively refines automatic word alignment of a parallel corpus with the goal of improving performance of an SMT system trained using the resulting word alignments. FIG. 2 is a pseudo code representation of the procedure implemented by the word alignment system 100. FIGS. 1 and 2 are referred to in the overview below, with more detailed description following in subsequent sections of the Description.

Referring to FIG. 1, the word alignment system 100 makes use of a set (S,T) of N paired sentences $(s_j, t_j)$ (FIG. 2, line 001) and maintains a weight $w_j$ associated with each pair, updating the weights from iteration to iteration. Generally, a weight $w_j$ represents a quality of the pairing and alignment of the $(s_j, t_j)$ sentence pair. The weights at the $i^{th}$ iteration are referred to as $w_i = \{w_{i,j}\}$, with the initial weights $w_0$ all being set to 1.0 (FIG. 2, line 002).

The system 100 includes two alignment modules 108, 120 each configured to accept a sentence paired parallel corpus 106, 118 and corresponding alignment model parameters 110, 122. Generally, the alignment module 108 treats sentences in the S set as being from the "source" language and sentences from the T set as from the "target" language. The model parameters $\theta_{s \to t}$ 110 characterize a statistical model that a sentence $s_i$ in the source language "generates" a sentence $t_i$ in the target language. The alignment module 118 reverses the roles of S and T as "target" and "source", respectively, and make use of a set of model parameters $\theta_{t \to s}$ 122.

As introduced above, the parallel corpora 106, 118 are weighted by a set of weights 104 before they are passed to the alignment modules 108, 120. The alignment modules 108, 120 use the weighted corpora and the alignment parameters 110, 122 to form updated word alignments 112, 124. An alignment $b_j$ represents an alignment of words in sentence $s_j$ with words in sentence $t_j$ using the $\theta_{s \to t}$ parameters, and the set of alignments determined at the $i^{th}$ iteration is represented as $B_i(S,T)$. Similarly, an alignment $c_j$ represents an alignment of words in sentence $t_j$ with words in sentence $s_j$ using the $\theta_{t \to s}$ parameters, and the set of alignments determined at the $i^{th}$ iteration is represented as $C_i(T,S)$. $B_i(S,T)$ and $C_i(T,S)$ are later combined by an alignment combination module 116 to form a bidirectional alignment 140 at the $i^{th}$ iteration, represented as $A_i(S,T)$ (FIG. 2, line 004).

The alignment modules also compute at each iteration updated parameters in the process of forming the new alignments. For example, the new parameters $\theta_{s \to t}$ 110 characterize the statistical model that generates a sentence $t_j$ in the target language from a sentence $s_j$ in the source language. The procedures carried out by alignment module 120 are generally the same, with the roles or the source and target languages reversed.

After all the paired sentences have been aligned in an iteration, the quality of each of the word alignments 112, 124 is assessed by an alignment quality assessment module 129 and these alignment qualities are used to update the set of weights 104. In this example, the quality of an alignment is determined according to the probability of the generated word sequence. For example, the quality of an alignment $b_j$ is computed as $P_{\theta_{s \to t}}(t_j, s_j)$.

The 'boosting' process by which the weights are updated is repeated M times in an iterative loop process 102, with the index i maintaining the number of iterations completed by the loop process (FIG. 2, line 003). The bidirectional alignment 140 is accumulated by an accumulation module 128 at each iteration of the loop 102. When the loop 102 completes M iterations, a final alignment is formed by merging the accumulated bidirectional alignments using a union module 132 (FIG. 2, line 010). The final alignment is then provided to downstream systems for further SMT training 134.

2 Parallel Corpora

The first parallel corpus (S,T) 106 is a body of text S written in a first language is associated with a body of text T in a second language on a sentence by sentence basis. The second parallel corpus (T,S) 108 is substantially the same as the first parallel corpus 106 with the exception that the roles of S and T are reversed to facilitate a bidirectional alignment. The parallel corpora 106, 118 each includes N sentence pairs. (FIG. 2, line 001). Note that the system does not require word or phrase level alignments in the corpora, and the system is tolerant of a range of quality of the pairing of the sentences.

2.1 Weights

Prior to providing the parallel corpora 106, 118 to the alignment modules 108, 120, the corpora 106, 118 are weighted by the set of weights 104. (FIG. 2, line 002) The set of weights 104 includes N scalar weights, each weight corresponding to one of the sentence pairs in the parallel corpora 106, 118. The same set of weights 104 is applied to both parallel corpora 106, 118. The first boosting iteration uses equal (unit) weight to each sentence pair of the parallel corpora 106, 118, and subsequent iterations use updated weights.

2.2 Alignment Modules

At the $i^{th}$ iteration of the loop 102, a set of alignments $B_i$ 112 is obtained by providing the weighted parallel corpus (S,T) 106 to the alignment module 108 along with the sets of alignment parameters $\theta_{s \to t}$ 110. (FIG. 2, line 004) The alignment module 108 is configured to analyze each of the sentence pairs $(s_j, t_j)$ included in the weighted parallel corpus 106 and determine words in a target sentence $t_j$ that correspond to words in a source sentence $s_j$. The associations of a word in the source sentence to corresponding words in the target sentence is called a link. The alignment module 108 also determines an alignment probability $p(t_j, s_j)$, which is the joint probability of the target sentence $t_j$ and the source sentence $s_j$ using the most likely alignment $B_i$, given the alignment parameters $\theta_{s \to t}$ 110 of the alignment model.

The word alignment system 100 is configured to generate at the $i^{th}$ iteration a set of alignments $C_j$ 124, which includes the links determined from sentences in language T to sentences in language S (i.e., a backward alignment). These backward alignments are determined by an alignment module 120, which performs the same procedures as the other alignment module 108, but uses a separate set of parameters $\theta_{t \to s}$ 122, and uses the second weighted corpus 118 as input.

Together the first ("forward") alignment 112 and the second ("backward") alignment 124 are referred to as a bidirectional alignment. In some examples, the links of the forward and backward alignment are combined in a heuristic fashion by an alignment combination module 116, such that links of the combined alignment are the intersection of the links of the forward and backward alignments.

The alignment modules 108, 120 compute updated parameters 110, 122 during the computation of the alignments 112, 124. Each of the pairs of training sentences $(s_j,t_j)$ and $(t_j,s_j)$ contribute to the updated parameters based on the weight $w_j$ of the pair, such that pairs with low weight contribute less to the updated parameters than pairs with higher weight. Note that in the first iteration, because all pairs have the same unit weight, all pairs contribute equally.

In some embodiments, the alignment modules implement the IBM Model 4 algorithm. (FIG. 2, line 004)

2.3 Accumulation Modules

The bidirectional word alignments $A_i$ 140 produced by the alignment combination module 116 are accumulated over the iterations by an accumulation module 128. The complete set of bidirectional word alignments 140 generated within the iterative loop process 102 are used by later modules of the system 100.

2.4 Alignment Quality Assessment

The set of N alignment probabilities 114, 126 is associated with from each of the alignments 112, 124 are passed to an alignment quality assessment module 129. The alignment quality assessment module 129 is configured to calculate a measure of the bidirectional alignment quality from the alignments 112, 124. Thus, for each sentence pair of each alignment 112, 124, an unsupervised measure of word alignment quality for boosting is calculated. (FIG. 2, line 005).

In the present embodiment, for each sentence pair, the forward alignment probability $p(t_j|s_j)$ and backward alignment probability $p(s_j|t_j)$ are combined and sentence-length normalized to determine a score, which provides a good correlate of alignment quality. In some examples, this combined and normalized score is computed as a geometric mean:

$$A_{PL}(s_j,t_j) = \exp((\ln p(s_j|t_j) + \ln p(t_j|s_j))/(|s_j|+|t_j|))$$

where $|s_j|$ and $|t_j|$ are the lengths of the sentences (in words).

In embodiments that make use of the IBM Model 4 alignment process, each source word is linked to exactly one target word (which may be the empty word NULL), therefore the number of allowable links in the forward and backward alignments is simply the total number of source and target words in the sentence pair $(s_j,t_j)$. Therefore, each of the scores $A_{PL}(s_j,t_j)$ is in the range 0.0 to 1.0.

2.5 Update Set of Weights

An updated set of weights 130 is generated by using the result of the alignment quality assessment module 129 to modify the set of weights 104. The updated set of weights 130 is used to weight the parallel corpora 106, 118 in the next iteration of the loop 102.

Specifically, FIG. 2, lines 006-008 present a detailed set of equations for updating the set of weights 104. The weighted average quality score over the entire parallel corpus is computed as:

$$\hat{o}_i = (\Sigma_{j=1}^N w_{i-1,j} PL_{i,j})/N$$

where $PL_{i,j}$ is the quality score $A_{PL}(s_j,t_j)$ computed in the $i^{th}$ iteration using the weights $w_{i-1,j}$ determined in the previous iteration. Using the IBM Model 4 procedure, $\hat{o}_i$ is in the range 0.0 to 1.0. A scale factor $\alpha_i$ is computed from $\hat{o}_i$ as $\alpha_i = 0.5 \ln((1-\hat{o}_i)/\hat{o}_i)$. The new weights are then determined by scaling each prior weight $w_{i-1,j}$ by $\exp(\alpha_i PL_{i,j})$ and then multiplicatively normalizing by a divisor Z so that the sum of the new weights is again N.

2.6 Union of Alignments

When the iterative loop 102 completes M iterations, the bidirectional word alignments 140 which were accumulated by the accumulation module 128 are provided to a union module 132 (FIG. 2, line 010). The union module 132 analyzes all of the accumulated alignments and creates a final alignment by aggregating word alignments from all boosting iterations using a "union" operation. Therefore, two words are linked if there is both a forward link and a backward link between the words at any iteration of the process.

Each iteration of the iterative loop 102 can result in a distinct word alignment that may be different from all others (i.e., includes a distinct set of links) due to the changes in the set of weights 104 from one iteration to the next. The differences between the bidirectional word alignments are reconciled for translation phrase pair extraction. The differences can be reconciled by calculating, for each sentence pair, the union of source-target word alignment links across all boosting iterations. The union module 132 combines the weak learners by taking, for each sentence pair, the union of the accumulated word alignments obtained from the forward and backward alignments at each iteration. The resulting final alignment includes far fewer unaligned source and target words than any of the individual alignments and is more robust to errors (e.g., a link missing from the baseline alignment could be present in one or more of the boosted versions).

The final alignment is passed on to later SMT training algorithms 134 that can be configured to extract translations rules such as phrase pairs from merged bidirectional (source-to-target and target-to-source) alignments.

Figure 3:
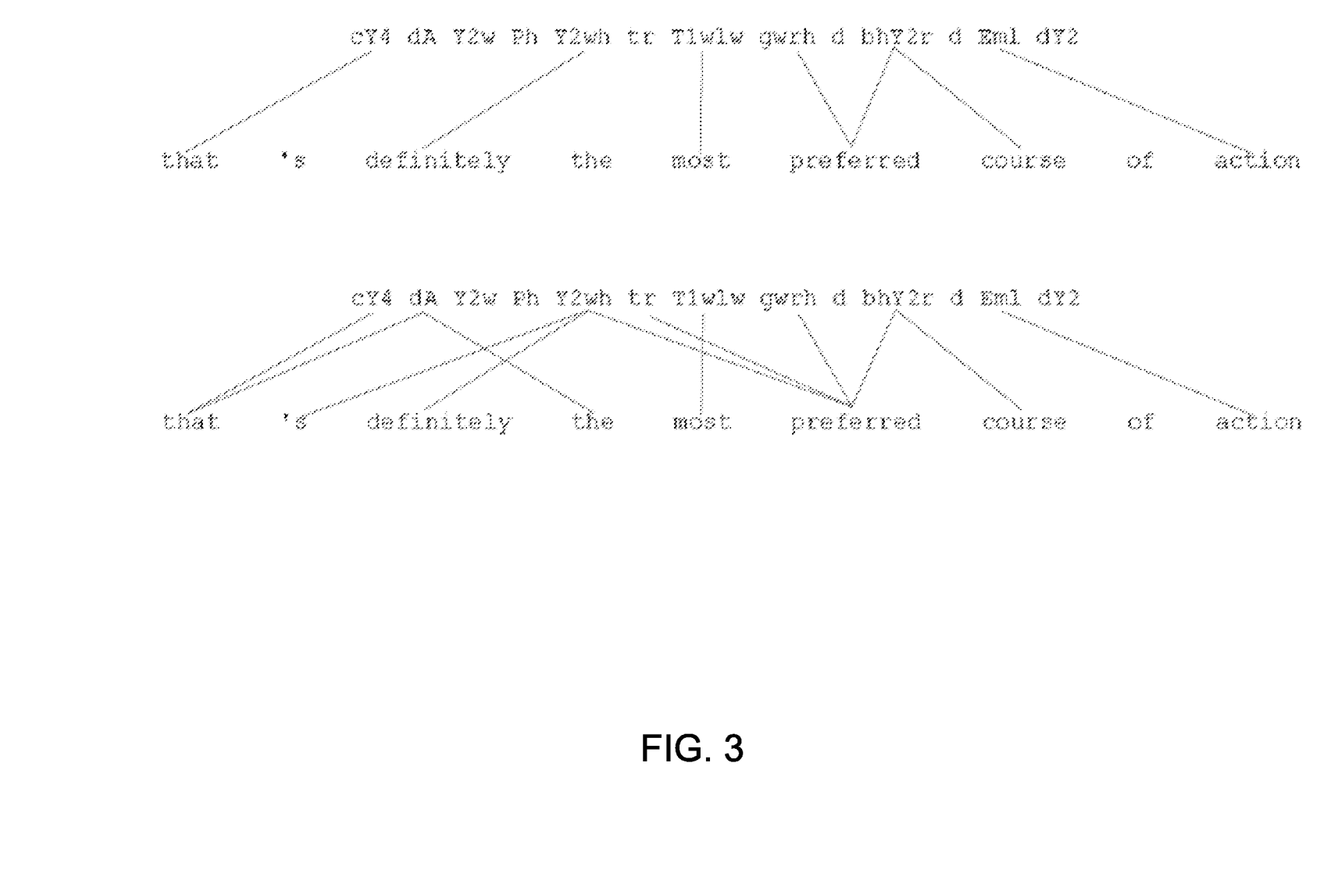
FIG. 3 shows two example alignments of two parallel sentences. The top example is a baseline alignment and the bottom example is a boosted alignment.

Referring to FIG. 3, a baseline alignment of a sentence pair 302 is compared to a final bidirectional alignment of the same sentence pair 304 for an English-to-Pashto translation task. The Pashto sentence is represented in Buckwalter notation, an ASCII-based encoding for languages using the Arabic script. Alignments such as these 302, 304 are used by a phrase pair extraction algorithm to create translation phrase tables.

For example, the heuristic phrase pair extraction algorithm described by Koehn et al. ("Statistical phrase-based translation," in *NAACL '03: Proc. 2003 Conf. of the N. American Chapter of the Assoc. for Comp. Linguistics on Human Language Technology*) is used to build a translation phrase table from the bidirectional baseline and union of boosted alignments. The phrase table encodes translation phrase pairs and their associated statistics, which are used by the SMT system (decoder) in conjunction with other parameters, as described below.

3 Phrase-Based SMT System Results

In the present embodiment, the final word alignment is provided to a phrase based SMT system. The system uses a log-linear model of various features (translation probabilities, language model probabilities, distortion penalty, etc.) to estimate the posterior probability of various target hypotheses given a source sentence. The hypothesis with the highest posterior probability is chosen as the translation output as is illustrated by the following equation.

The proposed word alignment boosting strategy was evaluated in the context of English-to-Pashto (E2P) and Pashto-to-English (P2E), a low-resource language pair. For E2P, the training and tuning consisted of 220 k, 2.4 k sentence pairs, respectively. For P2E, the corresponding corpus sizes were 236 k and 2.1 k sentence pairs. Two unseen test sets were used for both directions. The E2P test sets included T1 E2P, a test set of 1.1 k sentences with one reference translation each, and T2 E2P, a test set of 564 sentences with four reference translations per sentence. The P2E test sets included T1 P2E, consisting of 1.1 k sentences with one reference translation each, and T2 P2E, containing 547 sentences with four reference translations each. The multi-reference test sets came from the official DARPA TRANSTAC evaluations conducted by NIST.

First, baseline SMT systems were trained for both directions. The first step was to obtain forward and backward IBM Model 4 word alignment for the parallel training set using GIZA++. These were merged to produce bidirectional alignments for phrase pair extraction as described in Koehn et al. Target language models (LMs) were trained using all available data for English and Pashto, including target sentences from the corresponding parallel corpora. The LMs were fixed across all translation experiments described in this section. The tuning sets were used to optimize SMT decoder feature weights for E2P and P2E using MERT to maximize BLEU. Translation performance was then evaluated on all test sets in both directions using BLEU as a measure of translation accuracy.

Subsequently, trained phrase tables were trained from the union of boosted alignments obtained as described above for both directions. Twenty boosting iterations were performed. Decoder feature weights were re-tuned (with the same LMs and optimization starting points as the baseline) using MERT. Finally, translation performance of the boosted SMT system was compared to the baseline system across all test sets for E2P and P2E. The BLEU scores are summarized in FIG. 4.

Figure 4:
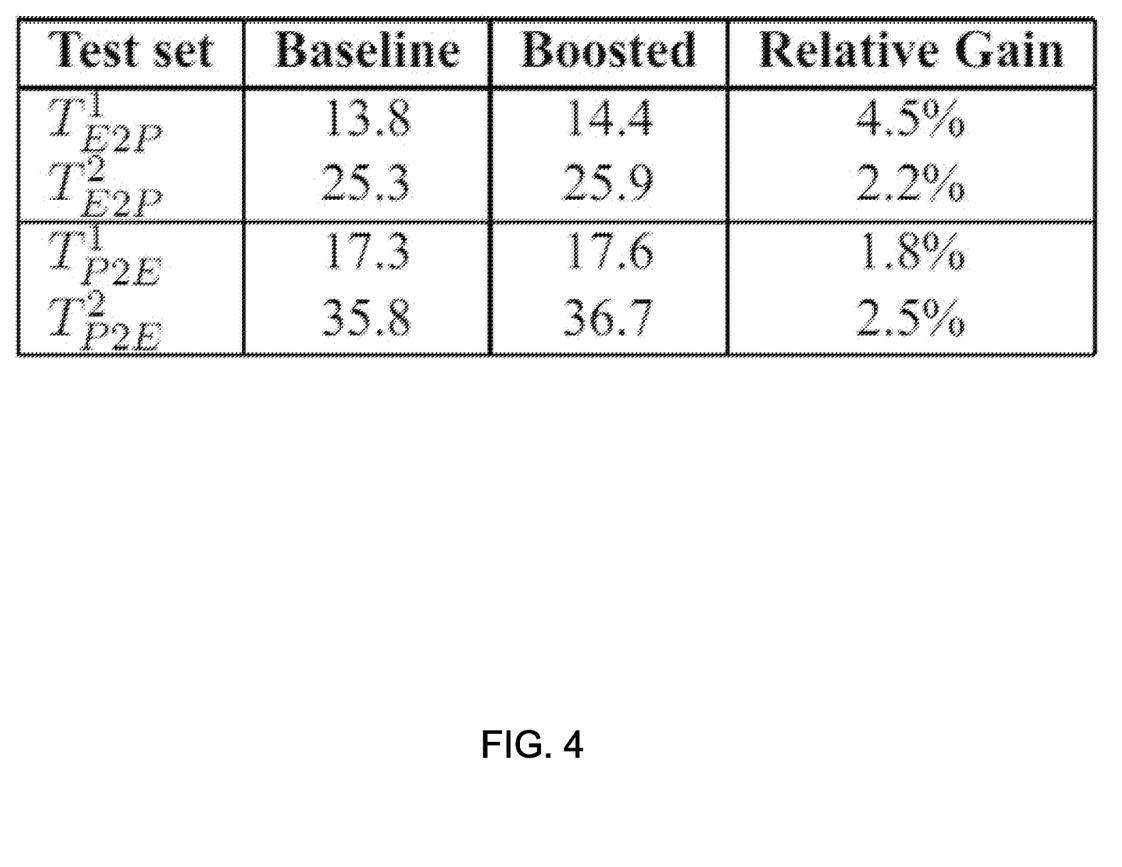
FIG. 4 is a table of the baseline and boosted system percentage BLEU scores for E2P and P2E test sets.

Referring to FIG. 4, with identical decoding parameters and pruning settings the proposed boosting strategy outperformed the baseline system by 0.6% BLEU on both test sets in the E2P direction; for P2E, a 0.3% improvement on the single-reference test set was obtained and a 0.9% gain on the multi-reference set. These improvements are consistent across multiple test sets in both directions.

Figure 5:
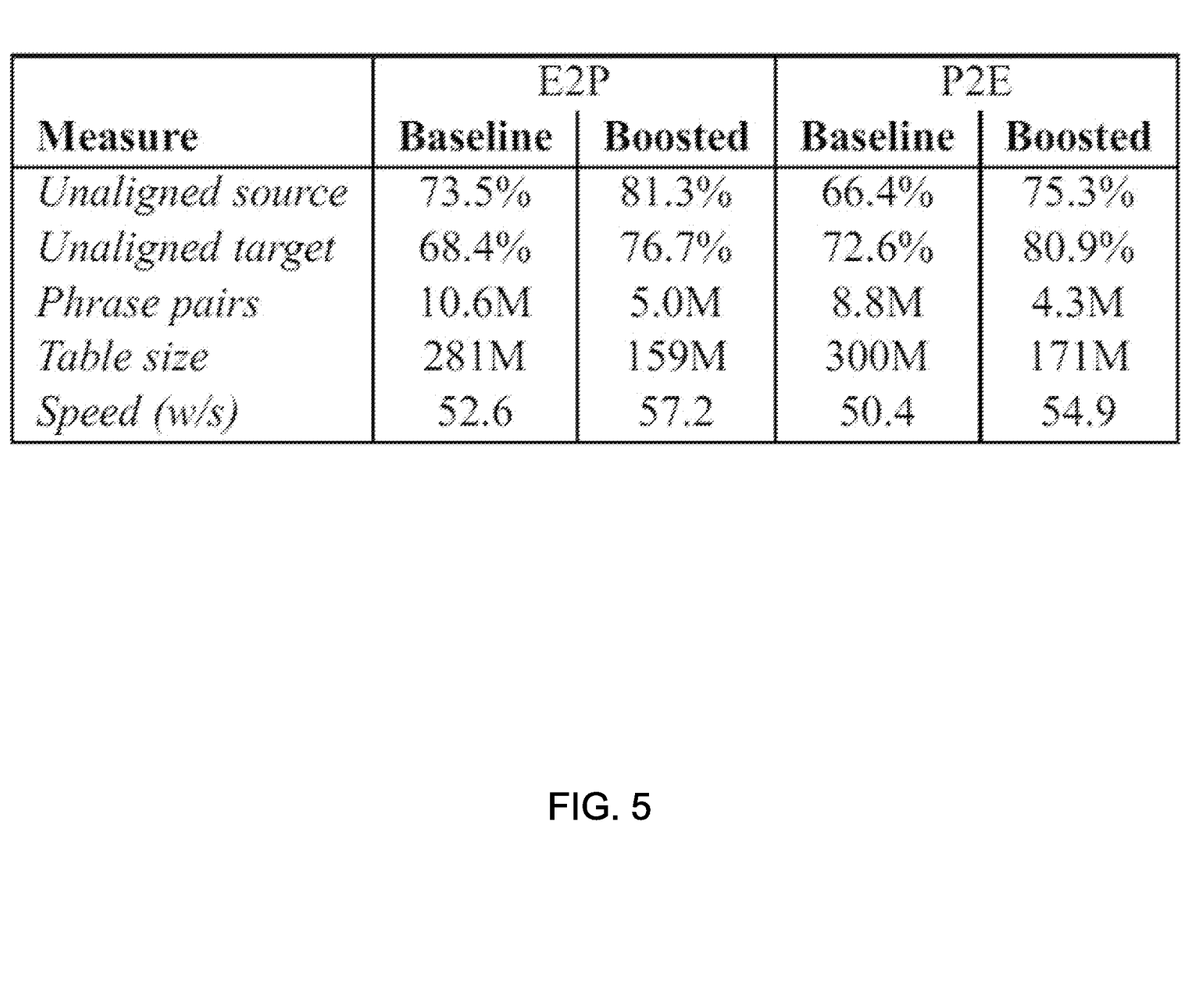
FIG. 5 is a table comparing phrase table size and decoding speed.

Compared to the baseline word alignment, the union of boosted alignments expectedly had a lower proportion of unaligned source and target words across language pairs, as shown in FIG. 5. As a result, the number of translation phrase pairs extracted from the union of boosted alignments was significantly lower than that obtained from the baseline system. The total number of phrase pairs in the E2P and P2E directions decreased by 52.6% and 50.8%, respectively. This led to a corresponding reduction in their storage footprint, as summarized in FIG. 5.

In order to gauge the improvement in translation speed as a result of the smaller phrase tables, the additional experiment of decoding the multi reference test sets T2 E2P and T2 P2E with our already highly efficient phrase-based decoder was performed on the Google Nexus One smart phone.

The comparison of decoding speeds is also summarized in FIG. 5. Using identical hypothesis pruning settings, decoding speed increased from 52.6 words/second to 57.2 words/second (an increase of 8.7%) for E2P, and from 50.4 words/second to 54.9 words/second (an 8.9% improvement) for P2E.

Thus, the proposed boosting technique achieves the distinction of improving translation accuracy, while simultaneously reducing storage requirements and decoding time over an already highly speed-tuned baseline. However, no significant reduction in search space or memory consumption was observed when using the boosted phrase table. This indicates that most of the speed gains come from faster search graph construction, given the number of translation options for a given source phrase is reduced by a factor of two.

4 Implementations and Alternatives

Embodiments of the approaches described above may be implemented in software, in hardware, or in a combination of hardware and software. Software implementations can include instructions stored on computer-readable media for causing one or more data processing systems to perform the functions described above. In some implementations, a single data processing system may be used, while in other implementations, multiple data processing systems (e.g., computers) may be used in a centralized and/or distributed implementation.

Examples described above do not necessarily assume any prior knowledge regarding the quality of the sentence pairs. In other examples, prior knowledge, for example, based on human review may be used by assigning non-uniform weights before the first iteration.

The specific computations described above for updating the weights of sentence pairs are only examples. Other similar approaches may be used without departing from the spirit of the overall approach. For example, other computations can achieve the result of increasing the weighting of relatively reliable sentence pairs while reducing the weight of unreliable pairs.

Other approaches for combining the alignments from different iterations can also be used rather than forming the union. For example, only a limited number of iterations can be combined, and consistency of alignment from iteration to iteration may be taken into account.

Other alignment procedures can also be used in place of IBM Model 4 (e.g., IBM Model 1, HMM alignment, etc.).

It is to be understood that the foregoing description is intended to illustrate and not to limit the scope of the invention, which is defined by the scope of the appended claims. Other embodiments are within the scope of the following claims.

What is claimed is:

1. A method for aligning linguistic units in paired sequences of units of a stored corpus comprising a plurality of paired sequences of units formed from two languages, the method comprising:
   determining a plurality of weights, one for each pair of the plurality of paired sequences of units, and maintaining the weights in a computer storage;
   applying a computer implemented procedure to iteratively update the plurality of weights, including at each iteration
      for each pair of the paired sequences of units, forming an alignment including aligning units in one sequence of the pair with units of the other sequence of the pair using a parametric alignment procedure using a set of alignment parameters,
      determining a quality score for the alignment for each of the paired sequences of units,
      updating the set of alignment parameters using the alignment procedure and dependent on the plurality of weights for the paired sequences, wherein the set of alignment parameters are updated such that paired sequences of units with weights representing a higher quality of alignment are emphasized as compared to paired sequences of units with weights representing a lower quality of alignment, and
      updating the plurality of weights maintained in the computer storage using the determined quality scores of the alignments; and
   combining the formed alignments from a plurality of the iterations to determine a combined alignment of units of the paired sequences.

2. The method of claim 1 wherein the linguistic units comprise words.

3. The method of claim 1 further comprising:
using the combined alignments as input to an automated training procedure for a Statistical Machine Translation (SMT) system.

4. The method of claim 3 further comprising:
using the trained SMT system to translate a sequence of units from a first of the two languages to the other of the two languages.

5. The method of claim 1 wherein the alignment procedure comprises an iterative statistically based procedure.

6. The method of claim 5 wherein the iterative statistically based procedure comprises an Expectation Maximization procedure.

7. The method of claim 1 wherein updating the alignment parameters using the alignment procedure and dependent on the plurality of weights for the paired sequences includes weighting a contribution of each paired sequence according to the maintained weight for said paired sequence.

8. The method of claim 1 wherein forming the alignment for each of the paired units includes forming a first alignment of units of the first language to units of the second language, and forming a second alignment of units of the second language to units of the first language.

9. The method of claim 8 wherein the alignment parameters include a first set of parameters for forming an alignment from the first language to the second language and a second set of parameters for forming an alignment from the second language to the first language.

10. The method of claim 8 wherein forming the alignment for each of the paired units includes combining the first alignment and the second alignment.

11. The method of claim 9 wherein combining the first alignment and the second alignment includes linking units that are linked in each of the first and the second alignments.

12. The method of claim 1 wherein determining the quality score for the alignment for each of the paired sequences of units includes determining a normalized probability of producing units in one sequence of the pair from units of the other sequence of the pair.

13. The method of claim 12 wherein determining the normalized probability includes determining a geometric per-unit average of a product of a probability of producing a first sequence of units of the pair from the second sequence of units or the pair, and the probability of producing the second sequence of the pair from first sequence of the pair.

14. The method of claim 1 wherein combining the formed alignments from the plurality of the iterations to determine the combined alignment of units of the paired sequences includes forming for each of the paired sequences a union of the alignments from the plurality of iterations.

15. The method of claim 1, wherein the steps are performed without requiring manual annotation of alignments of any of the units in the corpus of paired sequences.

16. A training system for machine translation comprising:
a storage for a plurality of weights, one weight corresponding to each of a plurality of paired sequences of linguistic units formed from two languages in a stored corpus; and
a module including a storage for a set of alignment parameters and configured to iteratively update the plurality of weights, including at each iteration
for each of the paired sequences of units, form an alignment including aligning units in one sequence of the pair with units the other sequence of the pair using a parametric alignment procedure using the set of alignment parameters,
determine a quality score for the alignment for each of the paired sequences of units,
update the alignment parameters using the alignment procedure and dependent on the plurality of weights for the paired sequences, wherein the set of alignment parameters are updated such that paired sequences of units with weights representing a higher quality of alignment are emphasized as compared to paired sequences of units with weights representing a lower quality of alignment, and
update the plurality of weights maintained in the computer storage using the determined quality scores of the alignments; and
wherein the module is further configured to combine the formed alignments from a plurality of the iterations to determine a combined alignment of units of the paired sequences.

17. Software comprising instructions embodied on a non-transitory machine readable medium for causing a data processing system to:
determine a plurality of weights, one for each of a plurality of paired sequences of linguistic units formed from two language in a stored corpus, and maintain the weights in a computer storage;
iteratively update the plurality of weights, including at each iteration
for each of the paired sequences of units, form an alignment including aligning units in one sequence of the pair with units the other sequence of the pair using a parametric alignment procedure using a set of alignment parameters,
determine a quality score for the alignment for each of the paired sequences of units,
update the alignment parameters using the alignment procedure and dependent on the plurality of weights for the paired sequences, wherein the set of alignment parameters are updated such that paired sequences of units with weights representing a higher quality of alignment are emphasized as compared to paired sequences of units with weights representing a lower quality of alignment, and
update the plurality of weights maintained in the computer storage using the determined quality scores of the alignments; and
combine the formed alignments from a plurality of the iterations to determine a combined alignment of units of the paired sequences.

\* \* \* \* \*